July 11, 1944. R. F. RUTHRUFF 2,353,624
TREATING HYDROCARBON FLUIDS
Filed June 6, 1939
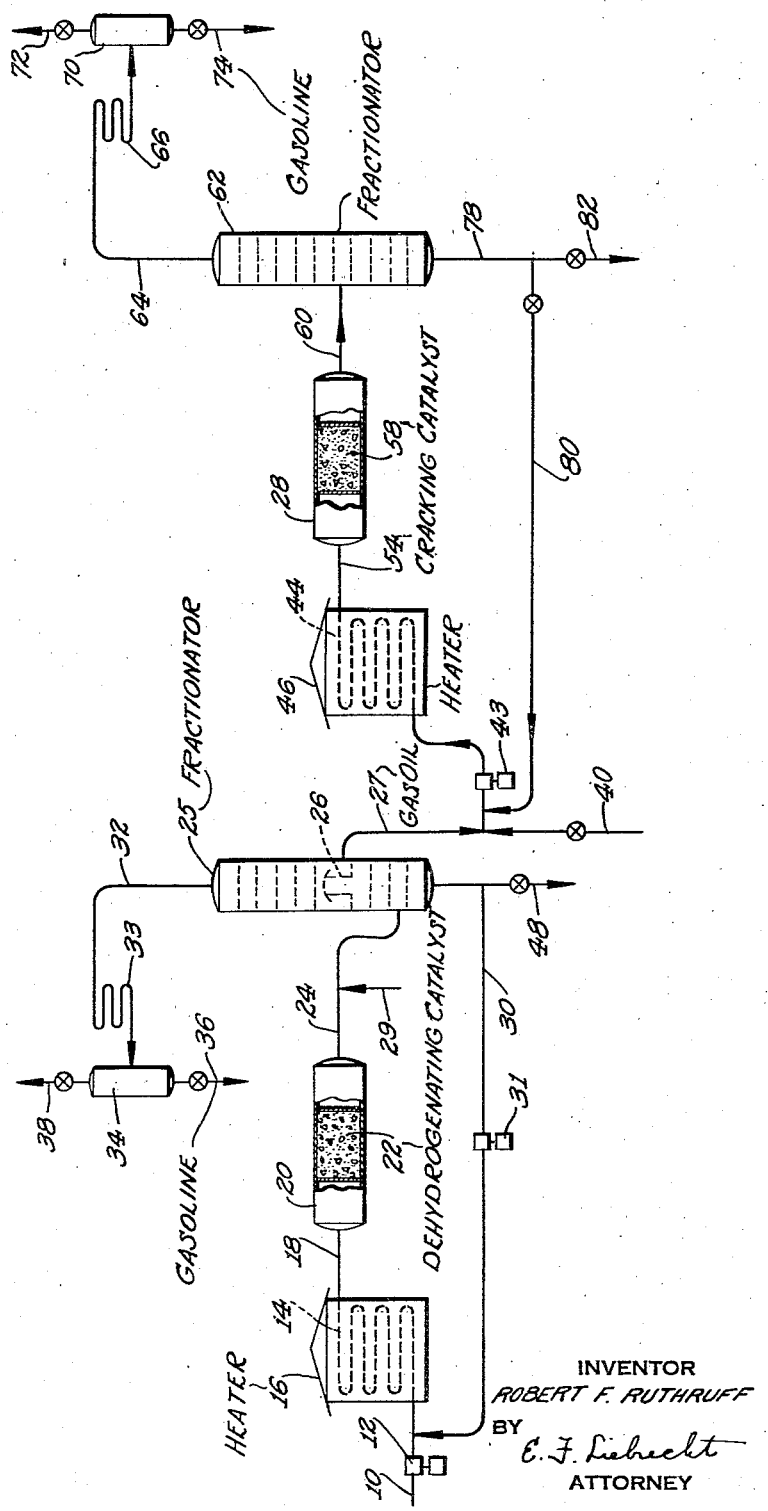
INVENTOR
ROBERT F. RUTHRUFF
BY
E. F. Liebrecht
ATTORNEY Patented July 11, 1944

2,353,624

UNITED STATES PATENT OFFICE 2,353,624

TREATING HYDROCARBON FLUIDS

Robert F. Ruthruff, Nutley, N. J.

Application June 6, 1939, Serial No. 277,580

11 Claims. (Cl. 196—52)

This invention relates to the treatment of hydrocarbons and is especially adapted for converting higher boiling hydrocarbons to lower boiling hydrocarbons.

According to my invention a relatively heavy hydrocarbon liquid to be converted, such as heavy gas oil, is heated and passed through one catalyst in a catalyst chamber to preferentially or selectively convert the higher boiling hydrocarbons of the charge into products of intermediate boiling range. This catalytic treatment includes dehydrogenation and prepares the hydrocarbon components for conversion in contact with a second catalyst in a later step in the process. At the same time some lighter components within the gasoline boiling range are formed but the action of the catalyst is to mainly convert the heavy ends of the hydrocarbon charge without attacking and converting the lighter components thereof. The catalytic conversion is preferably carried out under normal atmospheric pressure conditions but higher or lower pressures may be used.

After passing in contact with the first catalyst, the products of conversion are preferably fractionated to separate heavy condensate oil containing unconverted components as one fraction and lighter condensate oil as another fraction from gases and light hydrocarbon components within the gasoline boiling range. Or the products of conversion may be cooled to separate liquid from gases and the liquid may be distilled to separate gasoline components from a lighter gas oil all or a portion which may be removed to storage as a product. The heavy condensate oil may be recycled over the first catalyst.

The lighter condensate oil is preferably heated and passed through a second heated catalyst in a catalyst chamber for further catalytic treatment under substantially normal atmospheric pressure, but higher or lower pressures may be used. The second catalyst preferably comprises a catalyst which acts to convert substantially all the components of the lighter condensate oil with the production of larger amounts of gasoline than the amounts obtained in the first catalytic treatment and accompanied by relatively little change in the end point of the converted condensate oil. However, the end point of the converted condensate oil is somewhat lower than the end point of the unconverted condensate oil charge.

The products of conversion leaving the second catalyst chamber are fractionated to separate condensate oil from light hydrocarbon vapors containing gasoline constituents. The condensate oil may be removed as a product from the system and passed to storage or it may be recycled through the second catalyst for further treatment. The products of conversion leaving the second catalyst chamber may be cooled to separate liquid from vapors and the liquid distilled to separate gasoline constituents from higher boiling hydrocarbons.

Instead of passing all of the light condensate oil separated in the first mentioned fractionation to the second catalyst, a part thereof may be removed as a product from the system to storage.

In the drawing I have diagrammatically shown one form of apparatus adapted for practicing my invention but I am not to be restricted thereto as other forms may be used.

The oil to be treated may be a relatively heavy gas oil or wax distillate, such as, for example, one having an A. P. I. gravity of about 25.2° and an initial boiling point of about 634° F., and 90% off at about 755° F., is passed through line 10 by pump 12 and through heater 14 in furnace 16 where it is heated to about 700° F., to 1000° F., preferably about 850° F., under normal atmospheric pressure and is substantially completely vaporized. Any unvaporized liquid can be removed in any suitable manner. The vapors are then passed through line 18 and introduced into a catalyst container 20 provided with catalyst material 22. The vapors are passed through the catalyst material and remain in contact therewith for a sufficient length of time to effect the desired extent of conversion. The catalyst, at the beginning of the operation, is preferably preheated to the temperature of the vapors which are to be treated.

The catalyst 22 is one which selectively converts the heavier constituents of the charging oil stock into lower boiling constituents or into products of intermediate boiling range without converting any substantial amounts of the lighter constituents of the charging oil stock and without much production of lower boiling constituents in the gasoline boiling range. The preferred catalyst for this conversion is lead zinc chromite mounted on magnesia as a support. If desired, the magnesia support may be omitted. The catalyst 22 is made up of pieces of such size and shape that with the catalyst in position in the catalyst container 20, the vapors will be able to pass fairly freely through the catalyst and between the catalyst particles, the catalyst at the same time affording sufficient contact surfaces.

The preparation of lead zinc chromite on magnesia as a support will now be given. About 300 cc. of magnesia consisting of small pieces of about pea size are added to about 188 cc. of ammonium chromate solution containing about 0.25 mol of chromium. This solution is prepared by dissolving about 168 g. of ammonium dichromate in about 600 cc. of water, adding about 250 cc. of ammonia and then diluting to about 1000 cc.

The support is preferably saturated by the vacuum method by introducing the support and the ammonium chromate solution into a flask or other container which is evacuated in any suitable manner, as by a vacuum pump, and any air in the support is thus removed. After evacuation is complete, air is admitted suddenly into the space above the solution so that the liquid is forced into the support. If desired, the evacuation step and introduction of air above the solution may be repeated. The container is then heated for about one hour by placing it on a water bath or similar heating means, after which the container is removed.

About 180 cc. of a solution containing 0.225 mol lead (as lead nitrate) and 0.225 mol zinc (as zinc nitrate) are heated to about 175° F. and added with stirring to the hot support-ammonium chromate solution described above. By this operation the support is covered with an adherent layer of lead zinc chromate, additional material remaining in suspension. The support is removed from the solution and drained and the supported lead zinc chromate is then air dried at about 125° F.

To convert the lead zinc chromate to lead zinc chromite, I prefer to place a portion of the supported chromate in a porcelain dish which is heated by keeping a burner in constant motion and during heating the supported chromate is stirred continuously. At first some water is evolved, after which decomposition begins with the evolution of fumes. The decomposition is complete when fumes are no longer evolved and the catalyst is of uniform color. The rest of the supported chromate catalyst is similarly treated in portions to form the chromite catalyst. Or the whole batch of the chromate catalyst may be treated but care must be taken not to overheat the catalyst undergoing treatment.

The supported chromite catalyst is then leached for several hours with about 600 parts by volume of 10% acetic acid and then drained. The chromite catalyst is then repeatedly washed with water and then air dried at about 125° C. The supported lead zinc chromite catalyst is then ready for use and is placed in the catalyst container 20.

The treated vapors after contact with the catalyst 22 are passed through line 24 into the bottom portion of a fractionating tower 25 to separate relatively heavy condensate oil from lighter hydrocarbon vapors. The fractionating tower has a trap out tray 26 for collecting lighter condensate oil which is withdrawn and passed through line 27 to a second catalyst chamber or zone 28 as will be hereinafter described. Or part or all the charge oil, instead of passing through line 10 may be preheated and introduced through line 29 into line 24 or into the lower portion of fractionating tower 25. The lighter components of the charge will be vaporized and a portion thereof collected on trap out tray 26 for passage to the second catalyst chamber 28 instead of being first passed through the first catalyst zone 20. The heaviest components of the charge oil together with unconverted heavier components will be collected on the bottom of the tower 25 and withdrawn and recycled to the heater 14 through line 30 by pump 31.

If desired the trap out tray 26 may be omitted and condensate oil withdrawn from the bottom of tower 25 may in part be recycled to heater 14 and in part passed to heater 44.

The vapors remaining after fractionation in the fractionating tower 25 leave the top thereof through line 32 and are passed through condenser 33 to condensate the normally liquid constituents and passed to a separator 34 provided with a valved liquid outlet 36 and a valved gas outlet 38 to separate liquid containing gasoline constituents from gases.

Instead of passing the vapors to the fractionating tower 25, they may be cooled to condense normally liquid constituents to separate them from gases and the normally liquid constituents can be separately distilled to separate lighter hydrocarbons boiling off below about 400° F. from higher boiling constituents. In this way a wax distillate having the above mentioned characteristics and with 90% off at a temperature of 755° F., was passed over catalyst 22 and the liquid separated from the conversion products was distilled. The percentage by volume of lighter constituents boiling off up to about 400° F. was about 10% and the temperature at 90% off was about 655° F. From this it will be seen that the higher boiling components were converted to intermediate boiling components without producing much lighter components within the gasoline boiling range.

The lead zinc chromite catalyst is a dehydrogenating catalyst and the gas produced during the conversion contains mainly hydrogen. The gas also contains methane and small amounts of $C_2$ and $C_3$ hydrocarbons.

A portion or all of the relatively heavy condensate oil may be withdrawn from the bottom of fractionating tower 25 through line 48 as a product and passed to storage. Fresh charging oil from an extraneous source may be passed through line 40 and admixed with the condensate oil passing through line 27. Or condensate oil from trap out tray 26 may be mixed with gasoline from separator 34 and the mixture passed through line 27 and second catalyst chamber 28 for further conversion treatment.

The lighter condensate oil from trap out tray 26 is passed through line 27 by pump 43 and is heated and substantially completely vaporized in heating zone 44 in heater 46 and the vapors are passed through line 54 and introduced into the second catalyst chamber 28 containing catalyst 58.

The catalyst 58 in chamber 28 is different from catalyst 22 and is one which does not selectively convert the higher boiling hydrocarbon constituents of the oil charge but acts to convert substantially all of the hydrocarbon constituents of the oil vapors to produce a larger percentage of relatively light vapors containing gasoline constituents than the first mentioned catalyst 22. The end point of the oil passing through catalyst 58 is lowered a relatively small amount so that the end point of the treated oil will be slightly lower than the end point of the hydrocarbon oil charge introduced into the heating zone 44.

The catalyst 58 which I use in the second catalyst chamber 28 is a clay, preferably one having a silica to alumina weight ratio of about 4 to 1, but other catalysts may be used which act to produce large percentages of lighter hydrocarbons containing gasoline components. The clay may be a natural clay treated to obtain the desired ratio of silica to alumina or the clay may be synthetically prepared.

The lighter condensate oil which is passed through the catalyst 58 is heated to about 700° to 1000° F., preferably about 850° F., and under substantially normal atmospheric pressure to convert higher boiling constituents to lower boiling constituents. Higher pressures may be used, if desired. The lighter condensate oil is substantially completely vaporized and any unvaporized liquid may be separated in any suitable manner. The catalyst 58 is not as selective as the first catalyst 22 with respect to conversion of heavier hydrocarbons and greater amounts of lower boiling hydrocarbons in the gasoline boiling range are obtained.

The hydrocarbon vapors after passing through the clay or other catalyst 58 are passed through line 60 to a fractionating tower 62 to separate condensate oil from lighter vapors, the lighter vapors passing overhead through line 64 and then to condenser 66 to condense normally liquid constituents containing gasoline constituents. The liquid and gases are passed to a separator 70 having a valved gas outlet 72 and a valved liquid outlet 74 to separate normally liquid hydrocarbons within the gasoline boiling range from gases. The gases contain $C_2$, $C_3$ and $C_4$ hydrocarbons and are low in hydrogen. A larger percentage of liquid hydrocarbons within the gasoline boiling range is obtained and withdrawn through line 74 than is obtained in the first catalytic step at 22 and removed from separator 34 through line 36.

The condensate oil is withdrawn from the bottom of the fractionating tower 62 through line 78 and may be recycled through line 80 to the second heating zone 44 and then through the second catalyst chamber 28. Or a portion or all of the condensate oil may be withdrawn through line 82 and passed to storage or further treated as desired.

Instead of passing the converted vapors to the fractionating tower 62, they may be cooled to separate normally liquid constituents from normally gaseous constituents. For example, the condensate oil withdrawn from tray 26 in tower 25 or passing through the second catalyst 58 may have an initial boiling point of about 450° F., and an end point of about 750° F. and this condensate oil is heated and passed through catalyst 58. The liquid separated from the products of conversion leaving catalyst 58 when distilled shows that the percentage by volume of lighter constituents boiling off up to about 400° F. was about 50%. The results above given with respect to catalyst 22 and 58 relate to once-through operations.

For the catalyst in catalyst container 20 I prefer to use a chromite selected from the group, lead zinc chromite, copper barium chromite and nickel barium chromite, and in this group lead zinc chromite is the preferred catalyst; but other catalysts such as metallic nickel or molybdenum sulfide ($MoS_3$) may be used. If desired, the catalysts may be used on alumina or other supports or without supports. The complex chromite compounds may be made in the same way as described in the preparation of lead zinc chromite except that different metal solutions are used and of course alumina particles are used as a support rather than magnesia particles. For example, 0.225 mol copper (as copper nitrate) and 0.025 mol barium (as barium nitrate) were used to make the copper barium chromite catalyst following the steps given in the method of preparing lead zinc chromite. For the nickel barium chromite the heavy metal solution contained 0.225 mol nickel (as nickel nitrate) and 0.025 mol barium (as barium nitrate).

To prepare the molybdenum sulfide catalyst alumina was saturated with ammonium thiomolybdate preferably by the vacuum method after which the material was air dried. On gentle heating ammonium thiomolybdate decomposes to form molybdenum sulfide.

The catalysts may be used with supports such as alumina, magnesia, synthetic clays containing silica and alumina, promoted synthetic clays, natural clays, activated natural clays, and the like or the catalysts may be used without supports.

In passing the hydrocarbon oil charges over the first and second catalysts, each hydrocarbon charge is passed over about 220 cc. of each catalyst at the rate of about 85 cc. per hour. I am not to be limited to these figures as they are given merely by way of example.

Suitable reflux is provided for fractionating towers 25 and 62.

While my invention has been specifically described as a two stage process for converting hydrocarbons, it is not to be limited thereto, as the preferred group of catalysts, lead zinc chromite, nickel barium chromite and copper barium chromite, may be used in a one-step process where higher molecular weight hydrocarbons are to be converted to lower molecular weight hydrocarbons including gasoline, the lower molecular weight hydrocarbons including gasoline being withdrawn from separator 34 and the condensate containing higher molecular weight hydrocarbons being withdrawn through line 48 to be passed to storage or to be further treated as desired.

While I have given examples of catalysts and have included certain conditions for purpose of illustration, I am not to be restricted thereto as changes and modifications may be made within the scope of my invention.

This application is a continuation in part of my copending Application Serial No. 205,442, filed May 2, 1938.

I claim:

1. A process for treating hydrocarbons to produce lower boiling hydrocarbons which comprise contacting a relatively heavy hydrocarbon oil with a dehydrogenating catalyst comprising a heavy metallic chromite selected from the group consisting of lead zinc chromite, copper barium chromite and nickel barium chromite under conditions of temperature, pressure and time suitable to effect substantial cracking of said oil to lower boiling products boiling above the gasoline boiling range without the formation of substantial amounts of gasoline constituents but with the formation of a gas product containing mainly hydrogen.

2. The process of claim 1 wherein said dehydrogenating catalyst comprises lead zinc chromite.

3. The process of claim 1 wherein said dehydrogenating catalyst comprises lead zinc chromite supported on magnesia.

4. The process for treating hydrocarbons to produce lower boiling hydrocarbons which comprises contacting a relatively heavy hydrocarbon oil in the vapor phase with a dehydrogenating catalyst comprising lead zinc chromite under conditions of temperature, pressure and time suitable to effect substantial cracking of said oil to lower boiling products boiling above the gasoline boiling range without the formation of substantial amounts of gasoline constituents, separating from the products of said cracking operation a relatively light condensate oil boiling above the gasoline boiling range, and contacting said light oil with a cracking catalyst under conditions of pressure, temperature and time suitable to effect substantial conversion of said light oil to lower boiling products within the gasoline boiling range.

5. The process for treating hydrocarbons to produce lower boiling hydrocarbons which comprises contacting a relatively heavy hydrocarbon oil in the vapor phase with a dehydrogenating catalyst comprising lead zinc chromite supported on magnesia under conditions of temperature, pressure and time suitable to effect substantial cracking of said oil to lower boiling products boiling above the gasoline boiling range without the formation of substantial amounts of gasoline constituents, separating from the products of said cracking operation a relatively light condensate oil boiling above the gasoline boiling range, and contacting said light oil with a cracking catalyst under conditions of pressure, temperature and time suitable to effect substantial conversion of said light oil to lower boiling products within the gasoline boiling range.

6. The process for treating hydrocarbons to produce lower boiling hydrocarbons which comprises contacting a relatively heavy hydrocarbon oil with a dehydrogenating catalyst under conditions of temperature, pressure and time suitable to effect substantial cracking of said oil to lower boiling normally liquid products boiling predominantly above the gasoline boiling range and below the boiling range of said heavy oil, fractionating the products of said conversion treatment to separate therefrom a light fraction comprising gasoline constituents, a heavy fraction comprising a relatively heavy oil and an intermediate fraction consisting of a relatively light condensate oil boiling above the gasoline boiling range and having a boiling range substantially lower than that of said first-mentioned heavy oil, and contacting said light condensate oil with a cracking catalyst in the absence of either of said relatively heavy hydrocarbon oils under conditions of pressure, temperature and time suitable to effect substantial conversion of said light oil to lower boiling products within the gasoline boiling range.

7. A process in accordance with claim 6 wherein said relatively heavy hydrocarbon oil is contacted with a dehydrogenating catalyst supported on magnesia.

8. A process in accordance with claim 6 wherein said relatively heavy hydrocarbon oil is contacted with a dehydrogenating catalyst supported on alumina.

9. The process for treating hydrocarbons to produce lower boiling hydrocarbons which comprises contacting a relatively heavy hydrocarbon oil in the vapor phase with a dehydrogenating catalyst under conditions of temperature, pressure and time suitable to effect substantial cracking of said oil to lower boiling normally liquid products boiling predominantly above the gasoline boiling range and below the boiling range of said heavy oil, fractionating the products of said conversion treatment to separate therefrom a light fraction comprising gasoline constituents, a heavy fraction comprising a relatively heavy oil and an intermediate fraction consisting of a relatively light condensate oil boiling above the gasoline boiling range and having a boiling range substantially lower than that of said first-mentioned heavy oil, and contacting said light condensate oil with a cracking catalyst in the absence of either of said relatively heavy hydrocarbon oils under conditions of pressure, temperature and time suitable to effect substantial conversion of said light oil to lower boiling products within the gasoline boiling range.

10. The process for treating hydrocarbons to produce lower boiling hydrocarbons which comprises contacting a relatively heavy hydrocarbon oil with a dehydrogenating catalyst comprising a heavy metallic chromite selected from the group consisting of lead zinc chromite, copper barium chromite and nickel barium chromite under conditions of temperature, pressure and time suitable to effect substantial cracking of said oil to lower boiling normally liquid products boiling predominantly above the gasoline boiling range and below the boiling range of said heavy oil, fractionating the products of said conversion treatment to separate therefrom a light fraction comprising gasoline constituents, a heavy fraction comprising a relatively heavy oil and an intermediate fraction consisting of a relatively light condensate oil boiling above the gasoline boiling range and having a boiling range substantially lower than that of said first-mentioned heavy oil, and contacting said light condensate oil with a cracking catalyst in the absence of either of said relatively heavy hydrocarbon oils under conditions of pressure, temperature and time suitable to effect substantial conversion of said light oil to lower boiling products within the gasoline boiling range.

11. The process for treating hydrocarbons to produce lower boiling hydrocarbons which comprises contacting a relatively heavy hydrocarbon oil in the vapor phase with a dehydrogenating catalyst comprising a heavy metallic chromite selected from the group consisting of lead zinc chromite, copper barium chromite and nickel barium chromite under conditions of temperature, pressure and time suitable to effect substantial cracking of said oil to lower boiling normally liquid products boiling predominantly above the gasoline boiling range and below the boiling range of said heavy oil, fractionating the products of said conversion treatment to separate therefrom a light fraction comprising gasoline constituents, a heavy fraction comprising a relatively heavy oil and an intermediate fraction consisting of a relatively light condensate oil boiling above the gasoline boiling range and having a boiling range substantially lower than that of said first-mentioned heavy oil, and contacting said light condensate oil with a cracking catalyst in the absence of either of said relatively heavy hydrocarbon oils under conditions of pressure, temperature and time suitable to effect substantial conversion of said light oil to lower boiling products within the gasoline boiling range.

ROBERT F. RUTHRUFF.